United States Patent [19]

Lee et al.

[11] 4,053,785

[45] Oct. 11, 1977

[54] OPTICAL SMOKE DETECTOR WITH SMOKE EFFECT SIMULATING MEANS

[75] Inventors: Sung Chuel Lee, Bridgeport; Vaclav Oldrich Podany, Norwalk, both of Conn.; Hilario Simoes Costa, New Rochelle, N.Y.

[73] Assignee: General Signal Corporation, Rochester, N.Y.

[21] Appl. No.: 647,018

[22] Filed: Jan. 7, 1976

[51] Int. Cl.[2] .......... G01N 21/26

[52] U.S. Cl. .......... 250/574; 250/209; 250/575; 340/237 S

[58] Field of Search .......... 250/208, 209, 214 A, 250/210, 573, 574, 575, 564; 356/208, 209, 103; 340/237 S

[56] References Cited

U.S. PATENT DOCUMENTS

| | | | |
|---|---|---|---|
| 3,518,437 | 6/1970 | Riggs | 356/208 |
| 3,787,703 | 1/1974 | Topol | 250/574 |
| 3,863,076 | 1/1975 | Steele et al. | 250/574 |
| 3,868,184 | 2/1975 | Marsocci | 250/574 |
| 3,882,477 | 5/1975 | Mueller | 340/237 S |
| 3,892,485 | 7/1975 | Merritt et al. | 356/208 |
| 3,901,812 | 8/1975 | Hallengren | 250/575 |

*Primary Examiner*—David C. Nelms
*Attorney, Agent, or Firm*—Milton E. Kleinman; John Ohlandt

[57] ABSTRACT

Smoke detection apparatus including a pair of photoelectric cells which receive illumination in a predetermined ratio from a very low level light source. An improved simulating device is included for the purpose of testing the correct functioning of the alarm system connected to a sensing circuit formed by the photocells. The effects normally produced by smoke present in a chamber are simulated by selectively directing light from an auxiliary light source onto the sensing or "reflected" cell in the sensing circuit. In addition, a specially designed and constructed sensor head is provided for avoiding discrepancies in the placement of the critical elements; moreover, improved flow of any smoke present is promoted by the specific geometry of the sensor head. Also, discrepancies between the desired and actual ratio of illumination received by the respective photocells can be readily adjusted for electrically, and the light ratio between photocells can be changed by suitably adjusting the degree of illumination received by the direct cell.

5 Claims, 7 Drawing Figures

OPTICAL SMOKE DETECTOR WITH SMOKE EFFECT SIMULATING MEANS

BACKGROUND, OBJECTS AND SUMMARY OF THE INVENTION

The present invention relates to smoke detection apparatus, and more particularly, to apparatus for detecting the presence of smoke or other solids in response to changes in light effects within a housing chamber.

It has become widely recognized that early and reliable indication of the presence of smoke in a building or the like can be very effective in saving lives inasmuch as many victims are killed due to smoke inhalation rather than to fire.

A variety of apparatus has been proposed heretofore for the purpose of early detection of the presence of smoke. It has become a common practice to provide apparatus including an exciter lamp or light source which functions to illuminate a dark space in which particulate matter such as smoke is to be detected. One such form of apparatus includes a pair of photocells which are judiciously arranged so that variations with age, temperature, applied voltage, etc. will be compensated for due to the connection of the pair of virtually identical cells in a balanced circuit arrangement.

In order to provide a representative sample of prior art schemes for smoke detection so as to furnish background for the subject matter of the present invention, reference may be made to the following U.S. Pat. Nos. 3,409,885, 3,723,747 and 3,727,056. Reference may also be made to copending application Ser. No. 489,076, now U.S. Pat. No. 3,980,997 to the assignee of the present invention.

A fundamental object of the present invention is to provide a number of improvements for a smoke detector of the type described in the aforesaid copending application, namely, a smoke detector which can exploit the inherent advantages of a solid state, low illumination level lamp as the light source. One particular light source that has been found to be especially efficacious is a light emitting diode, which has an extremely long life of over twenty years.

A more particular object is to improve upon the simulating device or technique which serves to test the correct functioning of the smoke detection apparatus.

A further object is, through the use of the aforesaid solid state light source, to provide a small, portable, inexpensive and reliable unit that can be employed in the home and which will not require frequent servicing.

Another specific object is to enable a simplified adjustment of the ratio of resistances utilized in a bridge network in respect to the particular resistance values encountered for the photocells of the smoke detector.

Another specific object is to provide a precisely configured sensor head, said sensor head containing both the low level light emitting source and the reflected cell of the pair of photocells used in the system.

Yet another object of the invention is to provide a smoke detector in which it is insured that a significant flow of air will constantly be maintained through the detector so that the smoke content can be continuously monitored.

The improved features of the present invention are in the context or environment of an apparatus for detecting the presence of smoke, which apparatus comprises a housing defining an enclosure for the detector; a detection chamber within the enclosure for permitting the continuous air flow; a low level light source mounted within the enclosure; and first and second light receiving means in the form of photocells mounted within the enclosure; a sensing circuit, including a threshold means, the sensing circuit being connected to the pair of photocells and responding to a change in the illumination due to the presence of smoke so as to activate an alarm signal means and thereby provide a warning of the presence of smoke.

The specific object of an improved simulating device to be utilized in combination with the aforesaid smoke detector is implemented by the provision of a suitably located auxiliary light source such that light therefrom can be selectively directed on the reflected photocell, thereby to trigger the alarm or actuating device. Thus, instead of interfering with the light from the main light source by interposing a wire or the like such as to scatter the light to the reflected cell, a rotatable cylinder having an appropriate slot is interposed in the light path between the aforesaid auxiliary source and the reflected cell.

Accordingly, advantage is taken of the fact that the auxiliary light source is already adapted to serve as a "power on" indicator in the smoke detector; moreover, the rotatable cylinder affords a more rugged and effective means of simulating the desired effect directly without the need for uncertain scattering which might possibly arise because of incorrect variable placement of the main light source or of the wire typically used for scattering purposes.

The object of promoting efficient air flow is fulfilled by the provision of a sensor head which houses or contains the main light source and the reflected photocell. As a result, it will be appreciated that undesirable variations in locations of elements is obviated; that is to say, the disposition of both the light source and the reflected cell within a common head or block of material eliminates the possibility of variation, during assembly, of their positioning on a circuit board or the like.

Other and further objects, advantages and features of the present invention will be understood by reference to the following specification in conjunction with the annexed drawings, wherein like parts have been given like numbers.

DESCRIPTION OF PREFERRED EMBODIMENT

Figure 2:
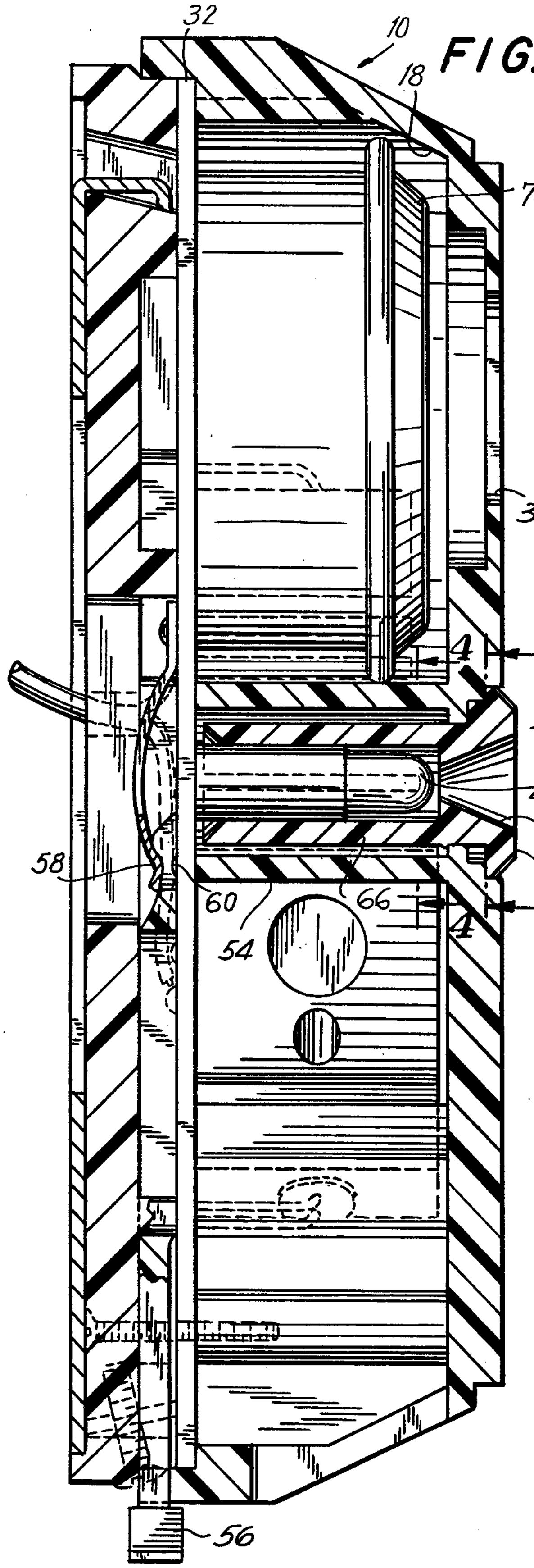
FIG. 2 is a sectional view taken on the line 2—2 through the unit illustrated in FIG. 1.
Figure 1:
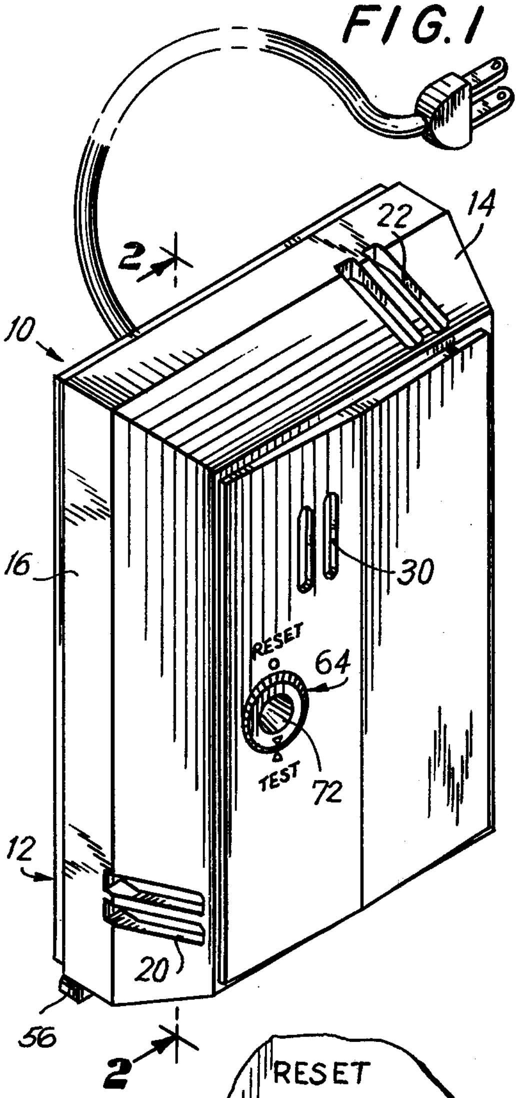
FIG. 1 is a perspective view of a complete smoke detector unit in accordance with the preferred embodiment of the present invention.
Figure 3:
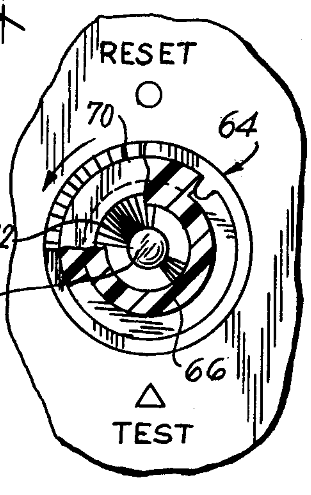
FIG. 3 is a fragmentary sectional view taken on the line 3—3, illustrating details of the testing device for testing the correct functioning of the unit.
Figure 4:
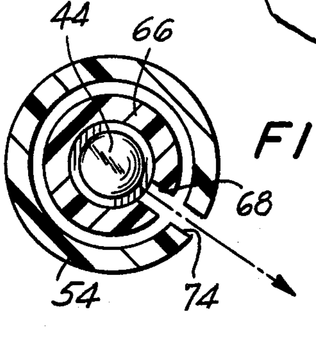
FIG. 4 is another fragmentary sectional view, taken on the line 4—4, of the testing device.

Referring now to the figures, and particularly for the moment to FIGS. 1-5, there will be seen a smoke detector device 10 constructed in accordance with the preferred embodiment of the present invention. The smoke detector device comprises a housing 12 which further includes a front cover 14 and a back cover 16.

The housing 12 defines an enclosure 18 having one or more inlet openings 20 formed, for the particular embodiment illustrated, in the front cover 14; also, outlet openings 22 are provided in this same front cover. These openings allow for the passage of air, as indicated by arrows (FIG. 5), into and out of the enclosure 18. The inlet openings 20 communicate with a labyrinthine passageway 24 defined by irregular partitions 26 integrally formed in the cover 14. The outlet area is similarly constructed so that the entire enclosure is, for this reason and because of the use of light absorbent surfaces throughout, substantially light-tight. The cover 14 includes a well 28 adapted to receive a portion of an alarm device 70; openings 30 permit sound to be emitted to the ambient but substantially no light transmission is possible therethrough to the interior of the housing because of the tight-fitting relationship of the alarm device with the front cover.

Figures 5, 6:
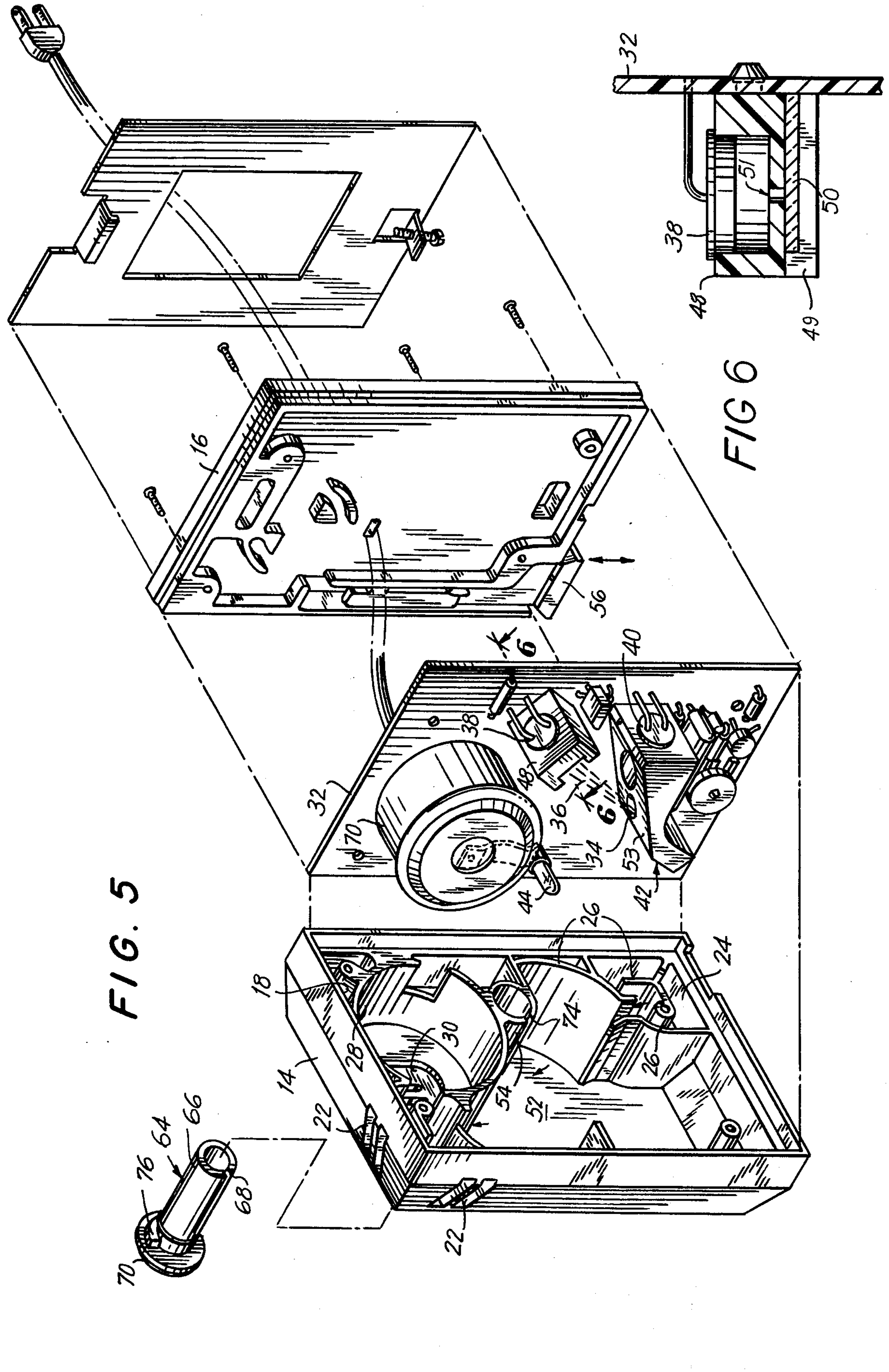
FIG. 5 is an exploded perspective view illustrating the spaced relationship of the various components of the smoke detector.
FIG. 6 is a sectional view, taken on the line 6—6, illustrating details of the direct photocell unit.

When the cover 14 is firmly in place, that is, when it is in tight-fitting relationship with the back cover 16, the inner parts of the front cover 14 abut at selected locations with a printed circuit board 32 (FIG. 5). The circuit board is adapted to be suitably affixed to the back cover 16. The circuit board 32 is also painted black or otherwise treated so as to be light absorbent. Mounted on the board 32 are substantially all of the active components of the smoke detector device which function together so as to respond to the presence of smoke and to sound an alarm device.

Figure 7:
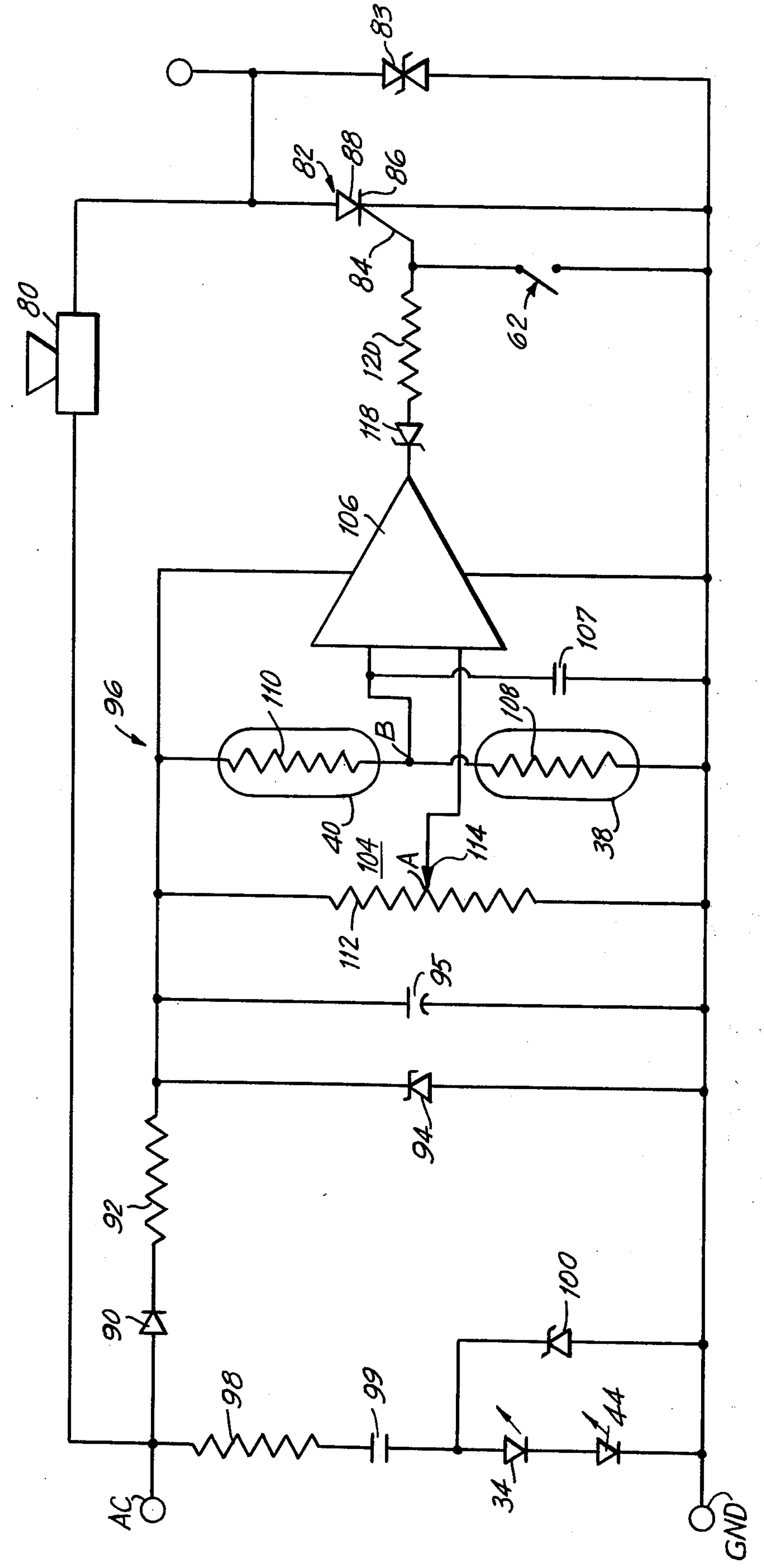
FIG. 7 is a schematic circuit diagram illustrating the electrical interconnection of various components.

As seen particularly to FIGS. 5 and 7, a main light source 34, in the form of a light emitting diode, is situated within the enclosure 18. Light from this source is directed in a narrow conical beam, having an axis 36, at a photoelectric cell 38. This cell is termed the "direct" cell precisely because it receives light directly along axis 36. Another photocell 40 is contained within a sensor head or block 42 which also contains the main light source 34. It will be noted that the photocell 40 is disposed at an angle of approximately 130° from the light beam axis and is suitably encased within the sensor head so that it normally is adapted to receive a relatively slight amount of the light emanating from main light source 34 under normal circumstances; that is to say, when no smoke is present within enclosure 18. It should also be noted that both of the photocells 38 and 40 are preferably constituted of the same material for reasons already given, that is, so that their characteristics will be substantially the same. Preferably, such material is cadmium-sulfide-selenide.

As will be especially seen in FIGS. 5 and 7, another light emitting diode 44 serving as an auxiliary light source is located on the circuit board in spaced relationship with the sensor head 42 and is surrounded by the cylindrical partition 54 which is integral with front cover 14. The purpose of this precise location is to insure that this auxiliary light source which normally functions as a "power on" indicator, can also serve as part of a testing arrangement to be described, whereby a smoke condition is simulated so that it can be determined whether or not the unit is functioning correctly.

As described hereinabove, the sensor head 42 contains both the main light source 34 and the reflected photocell 40. This arrangement insures a pre-established, fixed spaced relationship between these elements such that close tolerances do not have to be met, during assembly, for the precise positioning and mounting of the elements on a circuit board or the like. Accordingly, once this subunit or package has been fabricated, there need be no further worry about the proper placement of these individual elements, with respect to each other, in the detection system.

The direct photocell 38 is contained within a photocell block 48 which is configured, as will be seen in FIG. 6, such that slots 49 are provided at opposite interior surfaces for the reception of a light filter 50. In addition, immediately in back of the filter an aperture 51 is provided and the photocell itself is mounted directly in back of the aperture.

As a result of the above-described arrangement, the filter itself need not be of critical design or characteristics; moreover, the aperture 51 can be suitably tailored to adapt to different illumination ratio requirements. That is to say, the aperture 51 can be varied in size so as to change the illumination received by the direct cell 38 and hence, the ratio between the illumination it receives and that received by the indirect cell 40. Also as a result of the arrangement, the light received by the direct photocell 38 can be a small fraction of that emitted by the main light source 34.

It will be seen that the main light source 34, the integrally mounted reflected cell within the sensor head 42, and the direct photocell 38 are contained within a separate chamber 52. Air is freely circulated through this chamber 52, as bounded on the left by the wall 53 of sensor head 42, so that the amount of smoke present therein may be monitored. Such smoke chamber 52 is also bounded by the end partitions 26 of the labyrinthine passageway 24 at the inlet area and by similar partitions at the outlet area. Also, the lateral bounds of chamber 52 are defined on the right, as seen in FIG. 5, by partition 54 and a portion of the well 28. From this it will be appreciated that a very efficient flow of air is promoted from the inlet to the outlet of the detector.

It will be noted in FIG. 2 that device 10 also includes a slideable switch actuating arm 56. This arm is operable to silence an alarm signal when the user slides the arm all the way out from the housing. This results because a spring contact 58 is permitted to bear against a fixed contact 60 when the detented arm 56 is moved down, thereby short-circuiting an alarm initiating device. Once the smoke detector has cleared, that is, when sufficient clean air has moved through the smoke chamber, the arm 56 can be moved in so as to again open the contacts 58 and 60, which define a switch 62 (FIG. 7), thereby to reset the smoke detector.

It will also be noted in FIG. 7 that the main light source 34 and the auxiliary light source 44 are connected in a series circuit; further, that provision is made in the front cover 14 for the light from source 44 to be seen from the outside so that such source can serve, as already noted, as a "power on" indication.

As has been indicated, a principal feature of the invention resides in an arrangement or means for simulating a smoke condition. However, unlike such arrangements known in the prior art, what is provided herewith is a unique means which selectively directs a source of light onto the reflected photocell 40. Thus, the same effect as would be produced by a sufficiently large amount of smoke in the chamber 52 is enabled by the selective use of a light source. Preferably, this light source is the same auxiliary light source 44 which functions as a "power on" indication due to the transmission of its light to the outside of the housing. The source 44 is located at the center of test button or device 64, which includes a hollow cylindrical shaft 66 having a slot 68 formed therein so as to permit light from source 44 to impinge upon photocell 40 with sufficient intensity to actuate an alarm device. The test button 64 includes a knob 70 which is provided with an opening 72 (FIG. 2) so that light from source 44 may be seen from the front of the unit. The knob 70 may be grasped from a point outside the front cover 14 so that the button can be turned appropriately to direct the light from source 44 through the slot 68. The proper position for testing occurs when the slot 68 is lined up with a corresponding slot 74 in the partition 54. This position is reached when a flange 76 on shaft 66 encounters a suitably located stop within the space in cover 14 designed for housing device 64.

The slot 68 in the cylindrical shaft 66 is made of such size that an appropriate intensity of light will impinge upon the photocell 40. If desired, however, instead of a single slot as shown in the figures, a number of differently sized slots could be formed in the cylindrical shaft 66 so that different intensities of light could be selectively produced. Particular instructions could then be furnished a customer for indicating the discrete point at which the alarm signal should be triggered. Also, instead of a rotatable cylindrical shaft, a plunger device or arrangement could be provided whereby a slot or slots would register, upon applying sufficient inward pressure, with a corresponding slot or slots in partition 54.

Referring to FIG. 7, there will be seen a complete schematic circuit diagram for the smoke detection device of the present invention. Included in the circuit of FIG. 7 is a source of AC power as indicated by the symbols AC and GND. Power is conveyed to an alarm device 80 which is able to conduct current only if a trigger device 82 has been rendered conductive by reason of the application of suitably positive potential to its gate electrode 84, the cathode 86 thereof being connected to ground and the anode 88 thereof being connected to the alarm device 80. A suitable tandem connection, utilizing a pair of varistors 83, is shown on the right so that other alarm devices similar to 80 may be connected in tandem to the one trigger device.

DC power is derived from the AC source by means of a diode 90 connected to a resistor 92, which in turn is connected to a Zener diode 94 whose other end is taken to ground. The Zener diode 94 functions as a voltage regulating means, thereby supplying a substantially constant voltage to a sensing circuit 96. A smoothing capacitor 95 is connected at the input to sensing circuit 96 so that a substantially ripple-free voltage having a magnitude of approximately 11 volts is supplied thereto.

It will be noted that power is also supplied through a resistor 98 and capacitor 99 to the two light emitting diodes 34 and 44 in series. The diode 34, as previously noted, serves as the main light source for the smoke detector and the diode 44 functions both to indicate when power has been turned on to the unit and also as the auxiliary source which is selectively directed for test purposes. A Zener diode 100 is connected in parallel with the two series-connected diodes 34 and 44.

Sensing circuit 96 comprises a bridge network 104 and an operational amplifier 106 whose input impedance is of the order of $10^{12}$ ohms. The bridge network is composed of four legs, two of which, as will be seen, are made up of the resistances 108 and 110 of the respective photocells 38 and 40 connected in series between the DC supply and ground. The other two legs are made up of the portions of the potentiometer resistance 112 determined by moving the contact 114. The contact made will be referred to as having a potential A whereas the junction point between the resistances 108 and 110 will be referred to as having a potential B. Points A and B are connected to respective inputs of operational amplifier 106, capacitor 107 being connected from ground to the upper or B input.

Utilizing the adjustability technique afforded by the particular bridge network configuration illustrated, it will be clear that having made an initial selection of photocells having suitable resistances with an appropriate ratio therebetween, say for example, 20-to-1, the movable contact 104 can be varied so as to correspondingly proportion the values of resistance in the upper and lower legs of the bridge on the left side thereof so as to precisely balance the ratio as obtained due to the particular light impingement upon the respective photocells 40 and 38. Accordingly, if it should happen that the ratio between the resistances of the two photocells is changed under given conditions, the left side of the bridge can be adjusted to compensate for this; that is to say, the bridge can be brought back close to the desired balance point until there is the prescribed potential difference between points A and B.

With approximately 7 volts potential difference between points A and B, the operational amplifier 106, functioning as a comparator, maintains its output negative so that there is not a sufficient bias on a Zener diode 118 connected thereto; hence no trigger current flows through a resistor 120 connected to the diode 118. However, it will be understood that when smoke comes into the chamber 52 in sufficient quantity, the resistance of photocell 40 will drop due to the increased reflection of light thereto from the smoke particles; also, the resistance of direct photocell 38 will increase due to slight obscuration produced by the same smoke particles. Consequently, the potential at point B will rise sufficiently until such potential difference exists that the comparator 106 will be caused to switch its output from negative to positive, thereby overcoming the Zener voltage of diode 118 and providing a trigger current to the trigger device 82, which is a silicon controlled rectifier. Triggering of this device, of course, produces actuation of the alarm device 80 since current can now flow therethrough from the power source.

It should be noted that under normal circumstances the light beam traveling to the direct photocell 38 is in no way influenced by the passage of clean air so that the light beam is effective to maintain the resistance of that cell at its normally high level. Continuous passage of air is insured by normal drift in the ambient.

In the preferred embodiment, and particularly as seen in FIG. 5, the direct photocell 38 and the indirect or reflected photocell 40 are so arranged in their respective blocks or heads that the illumination received by the direct photocell is of the order of twenty times the illumination received by the reflected cell 40. However, the placement of the filter 50 and the associated aperture 51 is such that only approximately 0.2% of the total illumination put out by the main light source 34 impinges upon the direct photocell. Thus, taking a typical set of specifications as an example, the light emitting diode that serves as the main light source would put out an illumination of 0.0008 foot candles and the direct cell would receive approximately $1.6 \times 10^{-6}$ foot candles. On the other hand, the reflected photocell 40, under the assumption of normal or no smoke conditions, would receive approximately 0.01% of the aforesaid illumination put out by the light emitting diode, or in other words, about $0.08 \times 10^{-6}$ foot candles.

Looked at from the resistance standpoint, the direct cell, at standby or no smoke conditions, has a resistance of approximately $5 \times 10^6$ ohms, and this changes only slightly under smoke conditions to approximately $6 \times 10^6$; however, even though the degree of change in illumination on the reflected cell is relatively small, the resistance of the reflected cell changes from a very high value of the order of $150 \times 10^6$ ohms down to $3 \times 10^6$ ohms when smoke is present in the chamber 52. This will be understood as due to the nonlinear relationship between the impinging light and such resistance which exists at the low level end of the curve at which the detector of the present invention operates.

In considering the total operation of the smoke detector, let it be assumed first that normal illumination obtains within the chamber 52 due to the fact that there is no substantial smoke present therein. The aforedescribed values of illumination will also obtain. However, should there be a sufficient amount of smoke that comes into the detection chamber such that there is a smoke obscuration of two percent per foot therein, this will result, due to the reflection of light from the smoke particles present onto the reflected cell, a substantial change in its resistance to the much lower value just noted. Accordingly, a sufficient potential difference will be developed between the points A and B of FIG. 7 such that the Zener diode 118 will conduct, with the result that the trigger device 82 will be caused to go into conduction and consequently the alarm device 80 will sound. Any change in the direct cell due to obscuration resulting from the smoke present will produce cumulative results, that is, it will similarly cause the potential point B to rise above the point A with the same effect as described for the reflected cell. Therefore, any combination of white and black smoke will produce in varying proportions the appropriately desired directional change in potential for point B and ultimately of sufficient change in bias voltage on the comparator 106.

In order to provide the man skilled in the art with a detailed set of specifications for the preferred embodiment of the smoke detector, the following types or values of components are given:

| | |
|---|---|
| RESISTORS: | |
| 92 | 22 K ohms, ½W |
| 98 | 10 ohms, ½W |
| 110 | $100 \times 10^6$ (normal) |
| 108 | $5 \times 10^6$ ohms (normal) |
| 112 | 1 megohm |
| 120 | 2.0 K ohms, ¼W |
| DIODES: | |

-continued

| | |
|---|---|
| Light emitting diodes 34 & 44 | Exciton 554-9 |
| Zener diode 94 | 1N5241, 11 v, ½W |
| Zener diode 100 | 1N5343-B, 7.5 v |
| Zener diode 118 | 1N5231, 5.1 v, ½W |
| 90 | 1N4004 |
| Horn | Edwards Co. Midihorn 123 |
| CAPACITORS: | |
| 99 | 1 MFD |
| 95 | 10 MFD, 16 v |
| 107 | .022 μ F, 16 v |
| OPERATIONAL AMP. 106 | CA3130, MOSFET O.P. Amp. |
| S.C.R. 82 | C107B2 - 225 volts, 4 amp. |
| VARISTORS 83 (Matched pair with S.C.R.) | V130 LAX |

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. In a smoke detection apparatus in which there is included a housing enclosing a smoke detector chamber, a main light source mounted within the housing and a photocell device arranged within the housing for receiving substantial light from said main light source only when such light is scattered by smoke entering such chamber, the improvement which comprises a smoke effect simulating means, said means including an auxiliary or secondary light source, and means for selectively directing light from said auxiliary source onto said photocell so as to substitute for said light scattered by smoke, thereby to simulate the effect of the presence of smoke in said chamber.

2. Apparatus as defined in claim 1 in which said smoke effect simulating means includes a test button, and a partition defining said chamber and normally preventing light from entering said chamber from said auxiliary source, a slot in said partition and a corresponding slot in said test button, said test button being manipulatable from the outside of said housing so as to align the slot in the button with the slot in the partition.

3. Apparatus as defined in claim 2 in which a knob on said test button extends to the outside of said housing.

4. Apparatus as defined in claim 2, in which said test button comprises a rotatable hollow cylindrical shaft, and said auxiliary light source is located within said hollow shaft.

5. Apparatus as defined in claim 2, in which a plurality of differently sized slots are provided in said test button so that different intensities of light can be selectively directed from said auxiliary source onto said photocell.

* * * * *